US008187081B2

(12) United States Patent
Shai-Hee

(10) Patent No.: US 8,187,081 B2
(45) Date of Patent: May 29, 2012

(54) GAMING SYSTEM AND A METHOD OF GAMING

(75) Inventor: Michael A. Shai-Hee, Kingsgrove (AU)

(73) Assignee: Aristocrat Technologies Australia Pty Limited (AU)

( * ) Notice: Subject to any disclaimer, the term of this patent is extended or adjusted under 35 U.S.C. 154(b) by 414 days.

(21) Appl. No.: 12/477,250

(22) Filed: Jun. 3, 2009

(65) Prior Publication Data

US 2009/0325675 A1 Dec. 31, 2009

(30) Foreign Application Priority Data

Jun. 25, 2008 (AU) ................................ 2008903224

(51) Int. Cl.
*A63F 13/10* (2006.01)

(52) U.S. Cl. ........................................... 463/20; 463/21

(58) Field of Classification Search .............. 463/16–22, 463/30
See application file for complete search history.

(56) References Cited

U.S. PATENT DOCUMENTS

| | | | | |
|---|---|---|---|---|
| 4,119,320 | A | 10/1978 | Chorba et al. | |
| 5,611,535 | A * | 3/1997 | Tiberio | 273/143 R |
| 5,655,961 | A * | 8/1997 | Acres et al. | 463/27 |
| 7,195,559 | B2 * | 3/2007 | Gilmore et al. | 463/20 |
| 7,473,173 | B2 | 1/2009 | Peterson et al. | |
| 2004/0232617 | A1 | 11/2004 | Britt | |
| 2005/0049046 | A1 | 3/2005 | Kobayashi | |
| 2005/0059478 | A1 | 3/2005 | Peterson et al. | |
| 2005/0077676 | A1 | 4/2005 | Long, Jr. et al. | |
| 2005/0101367 | A1 | 5/2005 | Soltys et al. | |
| 2005/0125242 | A1 | 6/2005 | Butler | |
| 2006/0012718 | A1 | 1/2006 | Lee | |
| 2007/0259712 | A1 | 11/2007 | Head et al. | |
| 2009/0111571 | A1 * | 4/2009 | Nakamura et al. | 463/20 |
| 2009/0227338 | A1 * | 9/2009 | Yoshizawa | 463/20 |

FOREIGN PATENT DOCUMENTS

| | | | |
|---|---|---|---|
| DE | 3327173 | C1 | 1/1985 |
| FR | 2603201 | A1 | 3/1988 |
| GB | 662497 | A | 12/1951 |
| GB | 681855 | A | 10/1952 |
| JP | 8164238 | A | 6/1996 |
| JP | 10000373 | A | 1/1998 |
| JP | 11018644 | A | 1/1999 |
| JP | 2003175157 | A | 6/2003 |
| JP | 2004049394 | A | 2/2004 |
| JP | 2004166991 | A | 6/2004 |
| WO | 2004086183 | A2 | 10/2004 |

* cited by examiner

*Primary Examiner* — Evan Pert
(74) *Attorney, Agent, or Firm* — McAndrews, Held & Malloy, Ltd.

(57) ABSTRACT

A gaming system is disclosed which comprises a symbol selector arranged to select a plurality of symbols for display at a corresponding plurality of display positions, an outcome evaluator arranged to determine whether the selected symbols correspond to a winning symbol combination by evaluating symbols disposed in defined win lines, and a prize allocator arranged to allocate a prize to a player when a winning symbol combination exists in a defined win line. At least one display position is of different size to at least one other display position and the defined win lines are dependent on the respective sizes of and locations of the display positions. A corresponding method is also disclosed.

28 Claims, 10 Drawing Sheets

GAMING SYSTEM AND A METHOD OF GAMING

RELATED APPLICATIONS

This application claims priority to Australian Provisional Patent Application No. 2008903224 having a filing date of Jun. 25, 2008, which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention relates to a gaming system and to a method of gaming.

It is known to provide a gaming system which comprises a game controller arranged to randomly display several symbols from a predetermined set of symbols and to determine a game outcome such as a game win based on the displayed symbols. In some arrangements, a win outcome is defined on the basis of occurrence of symbols along defined win lines which may be preselected or selected by a player prior to display of symbols by the gaming system.

Such gaming systems may commonly be implemented as a stepper machine provided with reels with each reel carrying several symbols of the set, or a video machine wherein selected symbols are displayed on virtual reels on a graphical display device.

However, while such gaming systems provide users with enjoyment, a need exists for alternative gaming systems in order to maintain or increase player enjoyment.

BRIEF SUMMARY OF THE INVENTION

In accordance with a first aspect of the present invention, there is provided a gaming system comprising:

- a symbol selector arranged to select a plurality of symbols for display at a corresponding plurality of display positions;
- an outcome evaluator arranged to determine whether the selected symbols correspond to a winning symbol combination by evaluating symbols disposed in defined win patterns; and
- a prize allocator arranged to allocate a prize to a player when a winning symbol combination exists;
- wherein at least one display position is of different size to at least one other display position and the defined win patterns are dependent on the respective sizes of and locations of the display positions.

In one embodiment, the display positions are arranged in display position groups which may be in the form of physical or virtual reels.

In one embodiment, the display positions associated with a display position group are of the same size. The size of display positions in the display position groups may progressively decrease across a display area such that the number of display positions in the display position groups progressively increases across the display area. The size of the display positions in the display position groups may progressively decrease across a display area in a direction from left to right or right to left across the display area.

In one embodiment, a win pattern is defined to comprise at least one display position from each display position group, with display positions forming part of the win pattern being disposed in adjacent display position groups and being disposed adjacent each other such that a decision tree-like win line configuration is defined.

In one embodiment, at least one display position group comprises display positions of differing sizes.

In one arrangement, the sizes of the display positions are randomly selected.

In one arrangement, the gaming system is arranged to provide fixed display positions, and the symbol selector is arranged to select a plurality of symbols for display in the fixed display positions.

In an alternative arrangement, each selectable symbol is associated with a display position size such that selection of a symbol for display effects selection of the display position size.

The gaming system may be arranged to operate in normal game mode wherein display positions are the same size and the defined win patterns are independent of the size and locations of the display positions, and special game mode wherein the display positions are of differing sizes and the defined win patterns are dependent on the size and locations of the display positions.

The gaming system may be arranged to commence special game mode when a specific game outcome occurs.

In one embodiment, the gaming system comprises a display position modifier arranged during special game mode to replace at least one normal mode display position with a plurality of special game mode display positions, each special game mode display position being of smaller size that a normal mode display position.

In addition or alternatively, the gaming system may be arranged to commence special game mode on the basis of a game event occurring during a game such as display of a particular symbol, in response to player input, based on the amount or type of bet placed, or when a special game is purchased by a player.

The gaming system may be implemented as a stand alone gaming machine or across a network.

In one embodiment, one or more of the symbol selector, the display position modifier, the prize allocator and the outcome evaluator is constituted, at least in part, by a processor executing program code stored in a memory.

In one embodiment, the gaming system comprises a game play mechanism operable to place a wager and the outcome evaluator evaluates the outcome based on the wager.

In accordance with a second aspect of the present invention, there is provided a gaming system comprising:

- a display having a display area;
- a symbol selector arranged to select a plurality of symbols for display at a corresponding plurality of display positions in the display area, at least one display position being of different size to at least one other display position and the size of display area being fixed;
- an outcome evaluator arranged to determine whether the selected symbols correspond to a winning symbol combination by evaluating symbols disposed in defined win patterns; and
- a prize allocator arranged to allocate a prize to a player when a winning symbol combination exists.

In accordance with a third aspect of the present invention, there is provided a method of gaming comprising:

- providing a plurality of display positions, at least one display position being of different size to at least one other display position;
- selecting a plurality of symbols for display at respective display positions;
- determining whether the selected symbols correspond to a winning symbol combination by evaluating symbols disposed in defined win patterns, the defined win patterns being dependent on the respective sizes and locations of the display positions; and
- allocating a prize to a player when a winning symbol combination exists.

In accordance with a fourth aspect of the present invention, there is provided a computer program arranged when loaded into a computer to instruct the computer to operate in accordance with a gaming system comprising:

- a symbol selector arranged to select a plurality of symbols for display at a corresponding plurality of display positions;
- an outcome evaluator arranged to determine whether the selected symbols correspond to a winning symbol combination by evaluating symbols disposed in defined win patterns; and
- a prize allocator arranged to allocate a prize to a player when a winning symbol combination exists;
- wherein at least one display position is of different size to at least one other display position and the defined win patterns are dependent on the respective sizes of and locations of the display positions.

In accordance with a fifth aspect of the present invention, there is provided a computer readable medium having computer readable program code embodied therein for causing a computer to operate in accordance with a gaming system comprising:

- a symbol selector arranged to select a plurality of symbols for display at a corresponding plurality of display positions;
- an outcome evaluator arranged to determine whether the selected symbols correspond to a winning symbol combination by evaluating symbols disposed in defined win patterns; and
- a prize allocator arranged to allocate a prize to a player when a winning symbol combination exists;
- wherein at least one display position is of different size to at least one other display position and the defined win patterns are dependent on the respective sizes of and locations of the display positions.

In accordance with a sixth aspect of the present invention, there is provided a data signal having computer readable program code embodied therein for causing a computer to operate in accordance with a gaming system comprising:

- a symbol selector arranged to select a plurality of symbols for display at a corresponding plurality of display positions;
- an outcome evaluator arranged to determine whether the selected symbols correspond to a winning symbol combination by evaluating symbols disposed in defined win patterns; and
- a prize allocator arranged to allocate a prize to a player when a winning symbol combination exists;
- wherein at least one display position is of different size to at least one other display position and the defined win patterns are dependent on the respective sizes of and locations of the display positions.

BRIEF DESCRIPTION OF SEVERAL VIEWS OF THE DRAWINGS

The present invention will now be described, by way of example only, with reference to the accompanying drawings, in which.

DETAILED DESCRIPTION OF THE INVENTION

Figure 1:
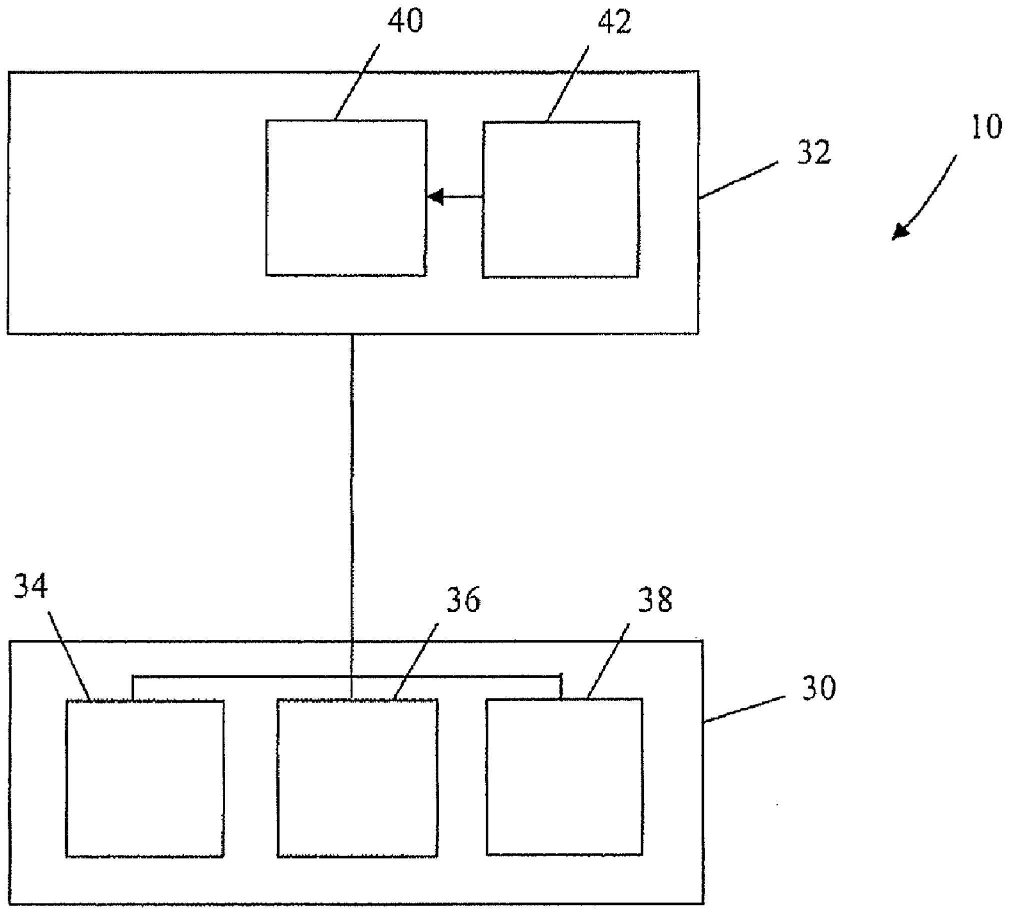
FIG. 1 is a schematic block diagram of components of a gaming system in accordance with an embodiment of the present invention.

The present gaming system operates such that during game play a plurality of symbols are randomly selected from a set of symbols and displayed at a corresponding plurality of display positions, the symbols shown at the display positions being used to determine game outcomes using defined win patterns.

In one conventional type of gaming machine, a display area including 15 display positions is presented to a player with the display positions being the same size and each display position including one symbol. The display positions are arranged in 5 vertically disposed reels with each reel having 3 visible display positions. After the reels are spun and subsequently stopped, the display positions show a random selection of symbols. Generally with such games a plurality of win patterns in the form of win lines are defined which extend across the reels and include one display position from each reel. Typically, in order for two display positions in adjacent reels to form part of a win line, the display positions must be disposed adjacent each other.

In one embodiment, at least during a portion of a game implemented by the gaming system, the gaming system is arranged to increase the number of display positions on at least one reel so that the number of symbols displayed on the reel increases by reducing the size of some of the display positions. As a consequence, the number of possible win lines increases and the likelihood of obtaining a winning outcome increases. The additional displayed symbols may be evenly distributed on a displayed portion of a reel, for example such that each original display position on the reel is replaced with two or more display positions, or such that one or more specific or randomly selected display position is replaced with multiple display positions.

Referring to the drawings, there is shown a schematic block diagram of a gaming system 10 arranged to implement a probabilistic game of the type wherein several symbols from a set of symbols are randomly displayed, and a game outcome is determined on the basis of the displayed symbols. The system may have a single mode of operation or may be of the type including multiple game modes such as operable in normal game mode wherein a base game is implemented and special game mode wherein a feature game is implemented.

With some such probabilistic games, the set of symbols used during normal game mode include standard symbols and function symbols, and the game outcome is determined on the basis of the displayed standard symbols and the function associated with any displayed function symbol. For example, standard symbols may resemble fruit such as apples, pears and bananas with a win outcome being determined when a predetermined number of the same fruit appear on a display along a win line, or are displayed according to defined outcome patterns such as scattered, and so on. The function associated with a function symbol may be for example a wild function wherein display of the function symbol is treated during consideration of the game outcome as any of the standard symbols. A function symbol may be represented as the word “WILD”, a star, or by any other suitable word or symbol. Other functions are also envisaged such as scatter functions, multiplier functions, repeat win functions, jackpot functions and feature commencement functions.

Referring to FIG. 1, a schematic diagram of components of a gaming system 10 in accordance with the present embodiment is shown. The components comprise a player interface 30 and a game controller 32. The player interface 30 is arranged to enable interaction between a player and the gaming system and for this purpose includes input/output components required for the player to enter instructions and play the game.

Components of the player interface 30 may vary but will typically include a credit mechanism 34 to enable a player to input credits and receive payouts, one or more displays 36 which may comprise a touch screen, and a game play mechanism 38 arranged to enable a player to input game play instructions.

The game controller 32 is in data communication with the player interface 30 and typically includes a processor 40 arranged to process game play instructions and output game player outcomes to the display 36. Typically, the game play instructions are stored as program code in a memory 42 that can also be hardwired. It will be understood that in this specification the term “processor” is used to refer generically to any device that can process game play instructions and may include a microprocessor, microcontroller, programmable logic device or other computational device such as a personal computer or a server.

Figure 2:
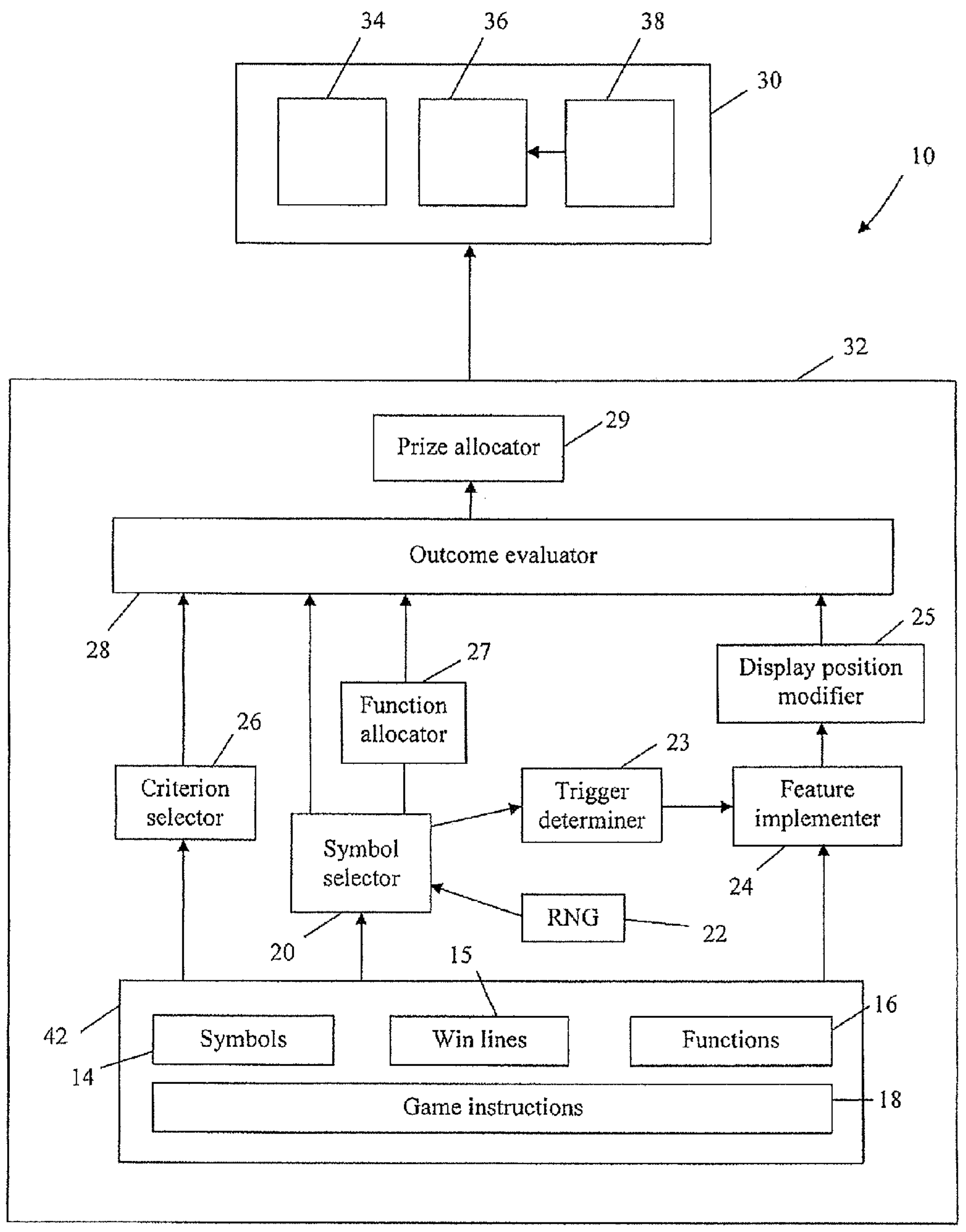
FIG. 2 is a schematic block diagram of functional components of a gaming system in accordance with an embodiment of the present invention.

A functional diagram illustrating operative components of the game controller 32 is shown in FIG. 2.

The memory 42 is arranged to store symbols data 14 indicative of a plurality of symbols, in the present example associated with a plurality of reels, win lines data 15 indicative of available win lines, function data 16 indicative of one or more functions allocatable to the symbols, and game instruction data 18 indicative of game instructions usable by the gaming machine 10 to control operation of the game.

The game controller 32 includes a symbol selector 20 which is arranged to select several symbols from the available symbols 15 for display to a player in a plurality of display positions, in this example by spinning reels containing the symbols and stopping the reels so as to display at least one symbol on each reel. In this example, the selection carried out by the symbol selector 20 is made using a random number generator 22.

It will be appreciated that the random number generator 22 may be of a type which is arranged to generate pseudo random numbers based on a seed number, and that in this specification the term “random” will be understood accordingly to mean truly random or pseudo random.

With this embodiment, the game controller 32 also comprises a trigger determiner 23 arranged to determine whether a trigger condition exists and to instruct a feature implementer 24 to implement special game mode when a trigger condition has been detected. Such a trigger condition may be display of a particular symbol or combination of symbols.

The feature implementer 24 controls a display position modifier 25 to modify the number of display positions shown in a reel on the display area so that additional symbols are shown on the modified reel and thereby additional win lines are possible.

In this example, the game controller 32 also comprises a function allocator 27 arranged to select and allocate one or more functions to one or more symbols. Such functions include a wild function, a scatter function, or any other function which may be applied to a symbol or to the game.

The game controller 32 also comprises an outcome evaluator 28 which in accordance with the game instructions 18 determines game outcomes based on the symbols selected for display to the player by the symbol selector 20.

The game controller 32 also comprises a prize allocator 29 arranged to allocate a prize to a player when a winning outcome exists.

In this example, the gaming system is operable in normal game mode and special game mode.

During normal game mode, each reel is associated with a plurality of display positions, in this example 3 display positions, with each display position showing one symbol.

Figure 9:
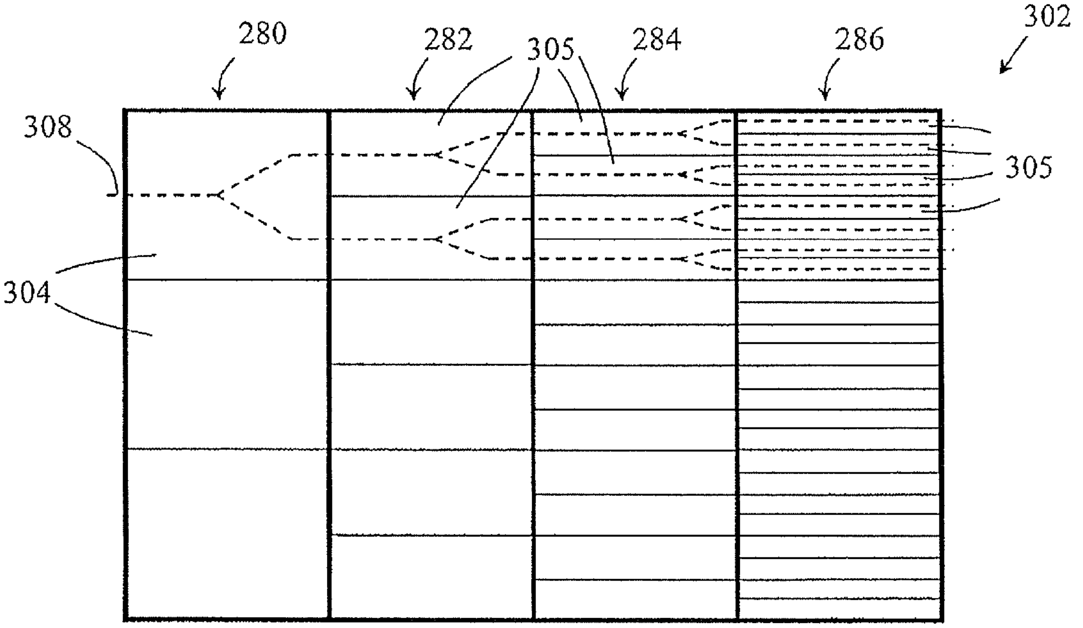
FIG. 9 is a diagrammatic representation of a display position configuration of a gaming system in accordance with an embodiment of the present invention during implementation of special game mode and illustrating example win lines.

During special game mode, the gaming system is arranged such that at least one display position is added to at least one reel. If multiple display positions are added to multiple reels and a win line is defined to include one display position from each reel, it is possible to create a tree-like win line configuration as shown in FIG. 9.

In the embodiments described below, the symbol selector 20, the trigger determiner 23, the feature implementer 24, the display position modifier 25, the function allocator 27, the outcome evaluator 28, and the prize allocator 29 are at least partly implemented using the processor 40 and associated software, although it will be understood that other implementations are envisaged.

The gaming system 10 can take a number of different forms.

In a first form, a player operable gaming device in the form of a stand alone gaming machine is provided wherein all or most components required for implementing the game are present in the gaming machine.

In a second form, a distributed architecture is provided wherein some of the components required for implementing the game are present in a player operable gaming device and some of the components required for implementing the game are located remotely relative to the gaming device. For example, a "thick client" architecture may be used wherein part of the game is executed on a player operable gaming terminal and part of the game is executed remotely, such as by a gaming server; or a "thin client" architecture may be used wherein most of the game is executed remotely such as by a gaming server and a player operable gaming terminal is used only to display audible and/or visible gaming information to the player and receive gaming inputs from the player.

However, it will be understood that other arrangements are envisaged. For example, an architecture may be provided wherein a gaming device is networked to a device server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Figure 3:
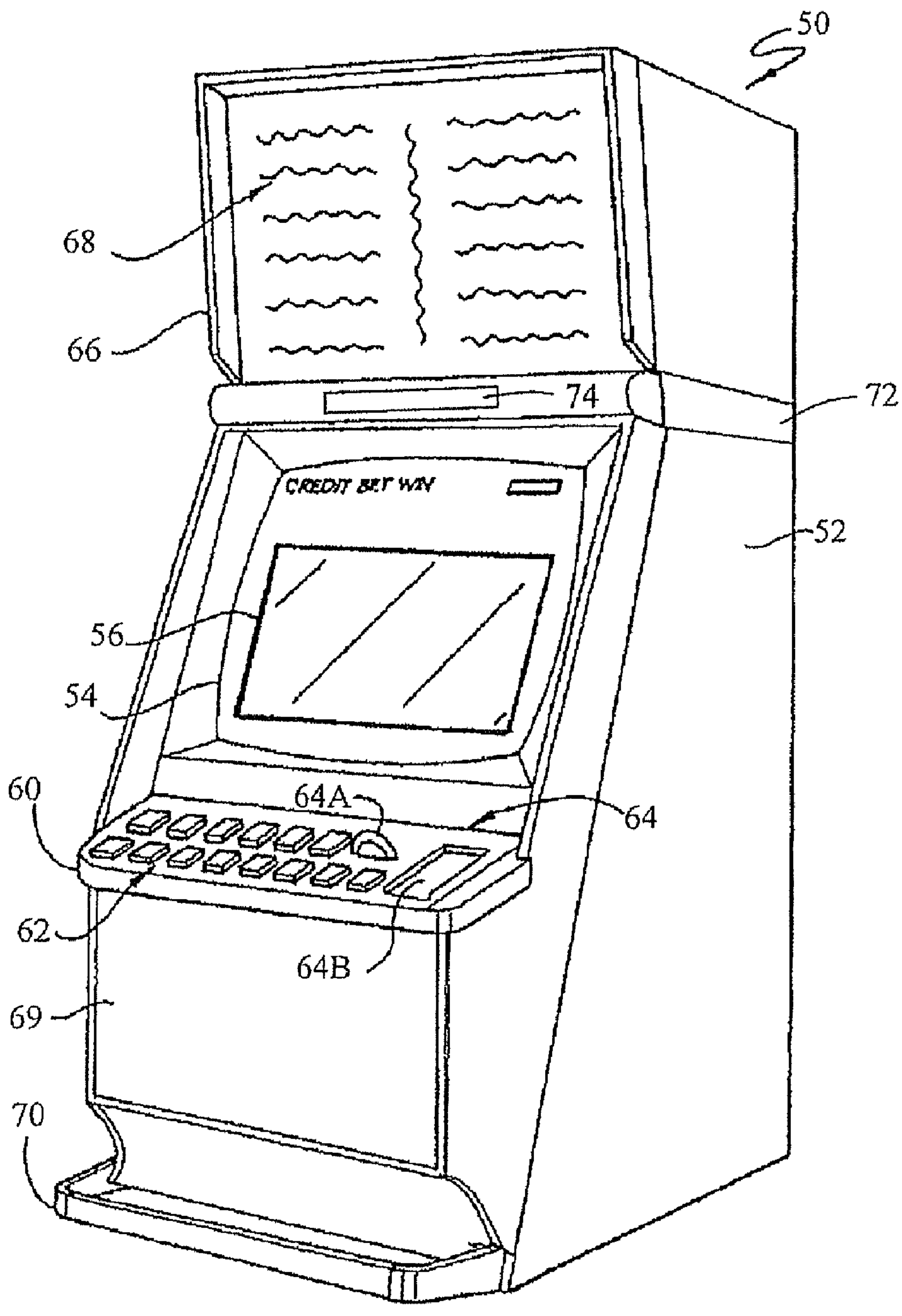
FIG. 3 is a diagrammatic representation of a gaming system in accordance with an embodiment of the present invention with the gaming system implemented in the form of a stand alone gaming machine.

A gaming system in the form of a stand alone gaming machine 50 is illustrated in FIG. 3. The gaming machine 50 includes a console 52 having a display 54 on which is displayed representations of a game 56 that can be played by a player. A mid-trim 60 of the gaming machine 50 houses a bank of buttons 62 for enabling a player to interact with the gaming machine, in particular during gameplay. The mid-trim 60 also houses a credit input mechanism 64 which in this example includes a coin input chute 64A and a bill collector 64B. Other credit input mechanisms may also be employed, for example, a card reader for reading a smart card, debit card or credit card.

A top box 66 may carry artwork 68, including for example pay tables and details of bonus awards and other information or images relating to the game. Further artwork and/or information may be provided on a front panel 69 of the console 52. A coin tray 70 is mounted beneath the front panel 69 for dispensing cash payouts from the gaming machine 50.

The display 54 is in the form of a video display unit, particularly a cathode ray tube screen device. Alternatively, the display 54 may be a liquid crystal display, plasma screen, or any other suitable video display unit. The top box 66 may also include a display, for example a video display unit, which may be of the same type as the display 54, or of a different type. The display 54 may comprise a touch screen usable by a player to interact with the gaming machine, in particular during game play.

The display 54 in this example is arranged to display representations of several reels, each reel of which has several associated symbols. Typically 3, 4 or 5 reels are provided. During operation of the game, the reels first appear to rotate then stop with typically three symbols visible on each reel. Game outcomes are determined on the basis of the visible symbols together with any special functions associated with the symbols.

A player marketing module (PMM) 72 having a display 74 is connected to the gaming machine 50. The main purpose of the PMM 72 is to allow the player to interact with a player loyalty system. The PMM has a magnetic card reader for the purpose of reading a player tracking device, for example as part of a loyalty program. However other reading devices may be employed and the player tracking device may be in the form of a card, flash drive or any other portable storage medium capable of being read by the reading device. In this example, the PMM 62 is a Sentinel III device produced by Aristocrat Technologies Pty Ltd.

Figure 4:
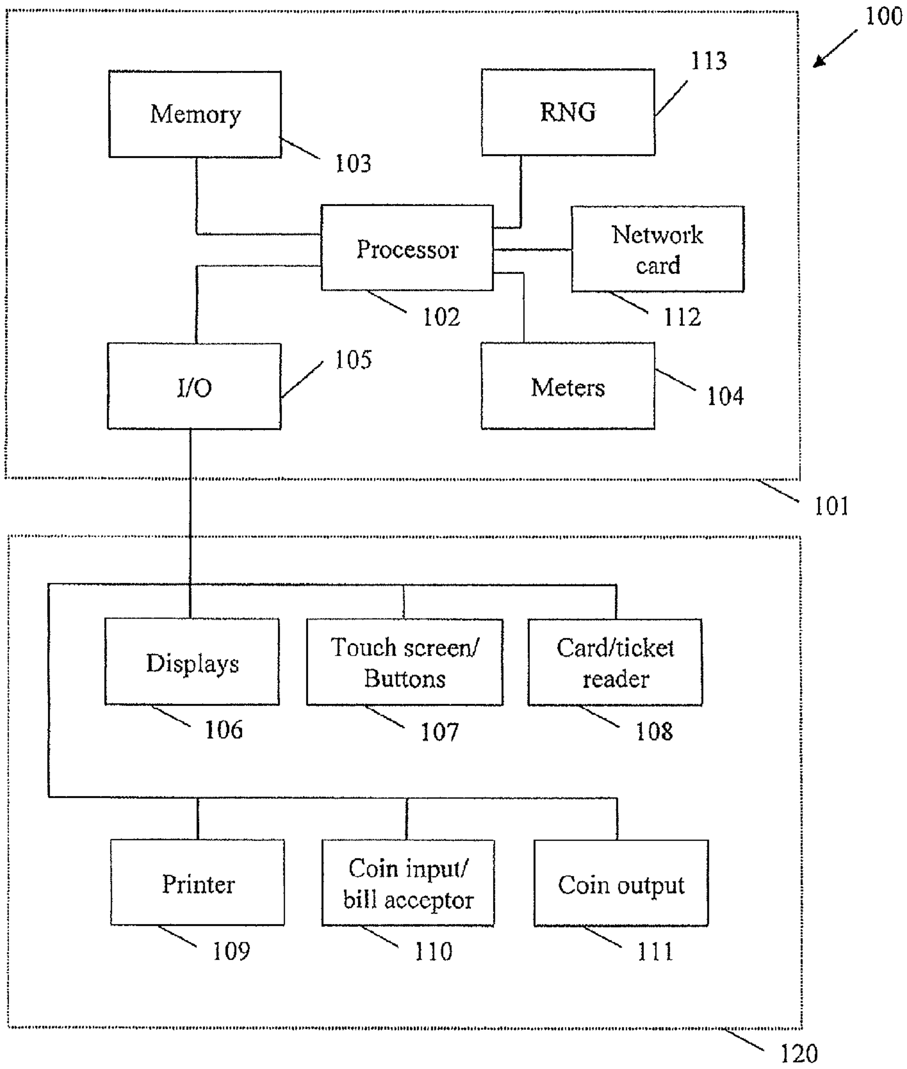
FIG. 4 is a schematic block diagram of operative components of the gaming machine shown in FIG. 3.

FIG. 4 shows a block diagram of operative components of a gaming device 100 which may be the same as or different to the gaming machine shown in FIG. 3.

The gaming machine 100 includes a game controller 101 having a processor 102. Instructions and data to control operation of the processor 102 in accordance with the present invention are stored in a memory 103 which is in data communication with the processor 102.

Typically, the gaming machine 100 will include both volatile and non-volatile memory and more than one of each type of memory, with such memories being collectively represented by the memory 103.

Figure 5:
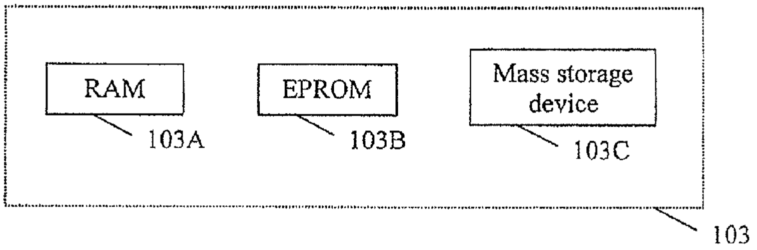
FIG. 5 is a schematic block diagram of components of a memory of the gaming machine shown in FIG. 3.

FIG. 5 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

The gaming machine has hardware meters 104 for purposes including ensuring regulatory compliance and monitoring player credit, an input/output (I/O) interface 105 for communicating with a player interface 120 of the gaming machine 100, the player interface 120 having several peripheral devices. The input/output interface 105 and/or the peripheral devices may be intelligent devices with their own memory for storing associated instructions and data for use with the input/output interface or the peripheral devices. A random number generator module 113 generates random numbers for use by the processor 102.

In the example shown in FIG. 4, the peripheral devices that communicate with the game controller 101 comprise one or more displays 106, a touch screen and/or bank of buttons 107, a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation.

In addition, the gaming machine 100 may include a communications interface, for example a network card 112. The network card may, for example, send status information, accounting information or other information to a central controller, server or database and receive data or commands from the central controller, server or database.

It is also possible for the operative components of the gaming machine 100 to be distributed, for example input/output devices 106, 107, 108, 109, 110, 111 may be provided remotely from the game controller 101.

Figure 6:
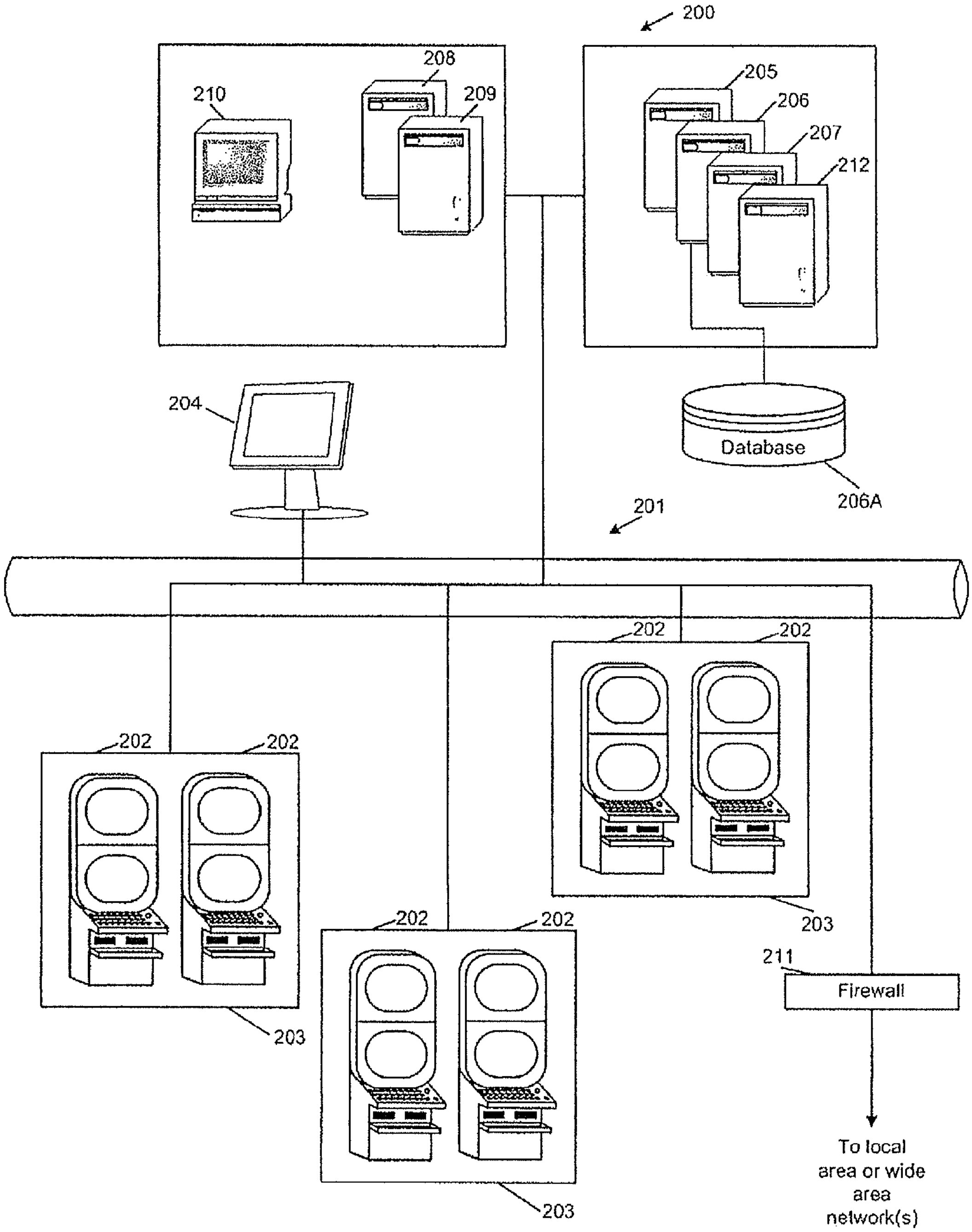
FIG. 6 is a schematic diagram of a gaming system in accordance with an alternative embodiment of the present invention with the gaming system implemented over a network.

FIG. 6 shows a gaming system 200 in accordance with an alternative embodiment. The gaming system 200 includes a network 201, which for example may be an Ethernet network, a LAN or a WAN. In this example, three banks 203 of two gaming machines 202 are connected to the network 201. The gaming machines 202 provide a player operable interface and may be the same as the gaming machines 40,100 shown in FIGS. 3 and 4, or may have simplified functionality depending on the requirements for implementing game play. While banks 203 of two gaming machines are illustrated in FIG. 6, banks of one, three or more gaming machines are also envisaged.

One or more displays 204 may also be connected to the network 201. The displays 204 may, for example, be associated with one or more banks 203 of gaming machines. The displays 204 may be used to display representations associated with game play on the gaming machines 202, and/or used to display other representations, for example promotional or informational material.

In a thick client embodiment, a game server 205 implements part of the game played by a player using a gaming machine 202 and the gaming machine 202 implements part of the game. With this embodiment, as both the game server 205 and the gaming machine 202 implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to monitor and carry out the Jackpot game.

In a variation of the above thick client embodiment, the gaming machine 202 may implement the game, with the game server 205 functioning merely to serve data indicative of a game to the gaming machine 202 for implementation.

With this implementation, a data signal containing a computer program usable by the client terminal to implement the gaming system may be transferred from the game server to the client terminal, for example in response to a request by the client terminal.

In a thin client embodiment, the game server 205 implements most or all of the game played by a player using a gaming machine 202 and the gaming machine 202 essentially provides only the player interface. With this embodiment, the game server 205 provides the game controller. The gaming machine will receive player instructions, and pass the instructions to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming system 200, including for example a gaming floor management server 208 and a licensing server 209 to monitor the use of licenses relating to particular games. An administrator terminal 210 is provided to allow an administrator to monitor the network 201 and the devices connected to the network.

The gaming system 200 may communicate with other gaming systems, other local networks such as a corporate network, and/or a wide area network such as the Internet, for example through a firewall 211.

A loyalty program server 212 may also be provided.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random number generator engine. Alternatively, a separate random number generator server could be provided.

Examples of specific implementations of the gaming system will now be described in relation to a stand alone gaming machine 10 although it will be understood that implementation may also be carried out using other gaming system architectures such as a network architecture of the type shown in FIG. 6.

In this example, the gaming system is operable in normal game mode and special game mode and the gaming system comprises five reels, each of which has an associated set of symbols.

The reels comprise standard symbols and optionally one or more function symbols and win outcomes are determined on the basis of the symbols visible at the display positions when the reels stop rotating.

Typically, a player will purchase or otherwise obtain win entitlements such as several win lines which are used in the game to determine win outcomes. If the displayed symbols on the reels have symbols associated with a winning combination such as disposed on a win line, the player wins a prize.

The gaming system may be arranged to commence special game mode when a predetermined game outcome occurs, and special game mode may comprise one or more free games. Special game mode may commence automatically on the basis of a game event occurring during a game such as display of a particular symbol, based on game outcomes determined by the gaming system, or may be prompted by a player pressing a button on the gaming system 10 after the player has identified that a game outcome corresponding to special game mode requirements has occurred.

The gaming system 10 may also be arranged so as to determine eligibility for special game mode, for example based on the amount or type of bet placed, based on certain time periods and so on.

Special game mode may also be arranged to commence when a special game is purchased by a player.

Figure 7:
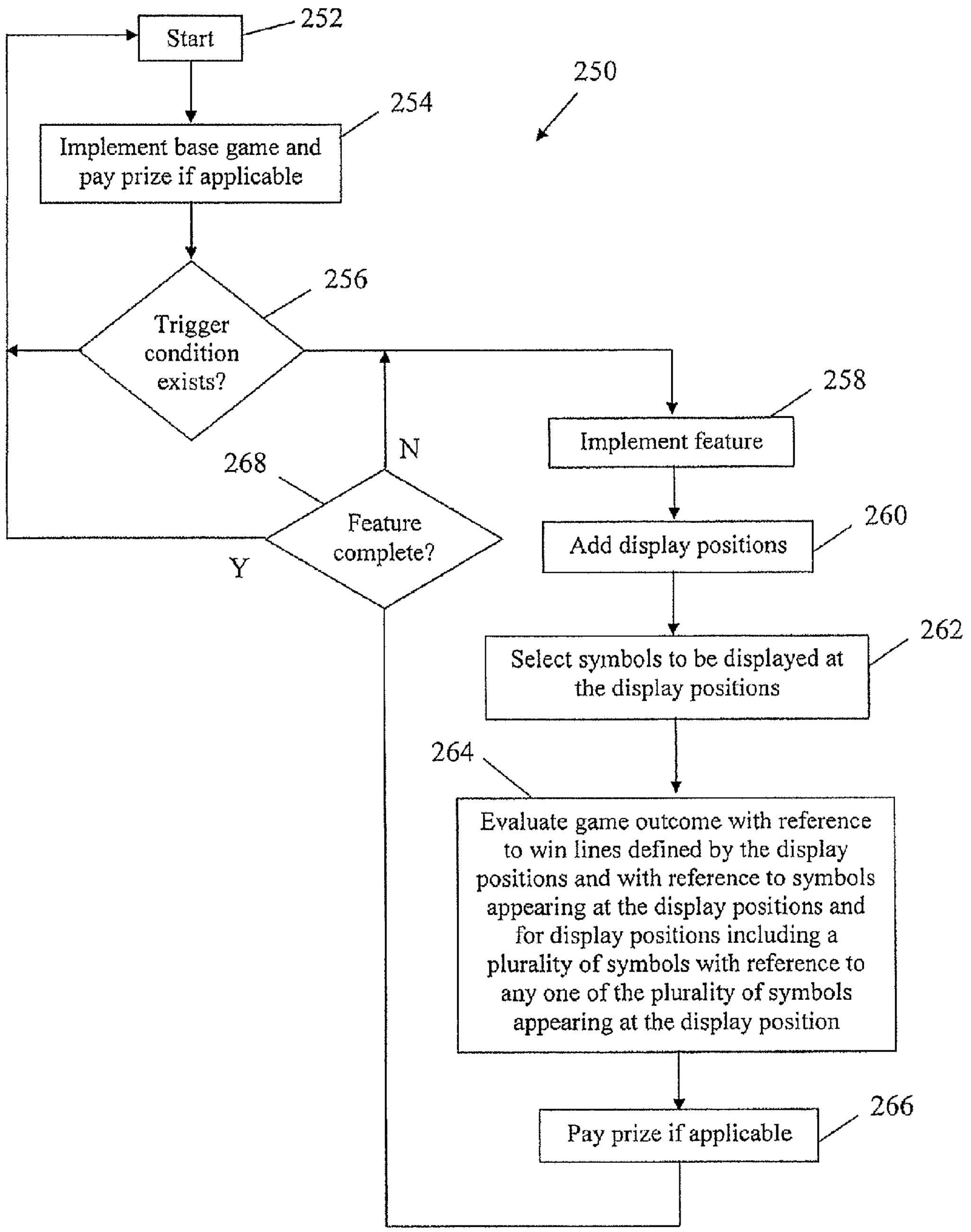
FIG. 7 is a flow diagram illustrating game play of a gaming system in accordance with an embodiment of the present invention.

A specific example will now be described in relation to flow diagram 250 shown in FIG. 7 which illustrates steps 252 to 268 of a method of gaming implemented by the gaming system according to the present embodiment.

In this example, four virtual reels 280, 282, 284, 286 are provided and displayed on a graphical display device 44 in a display area 302. However, it will be understood that any number of reels may be provided.

Figure 8:
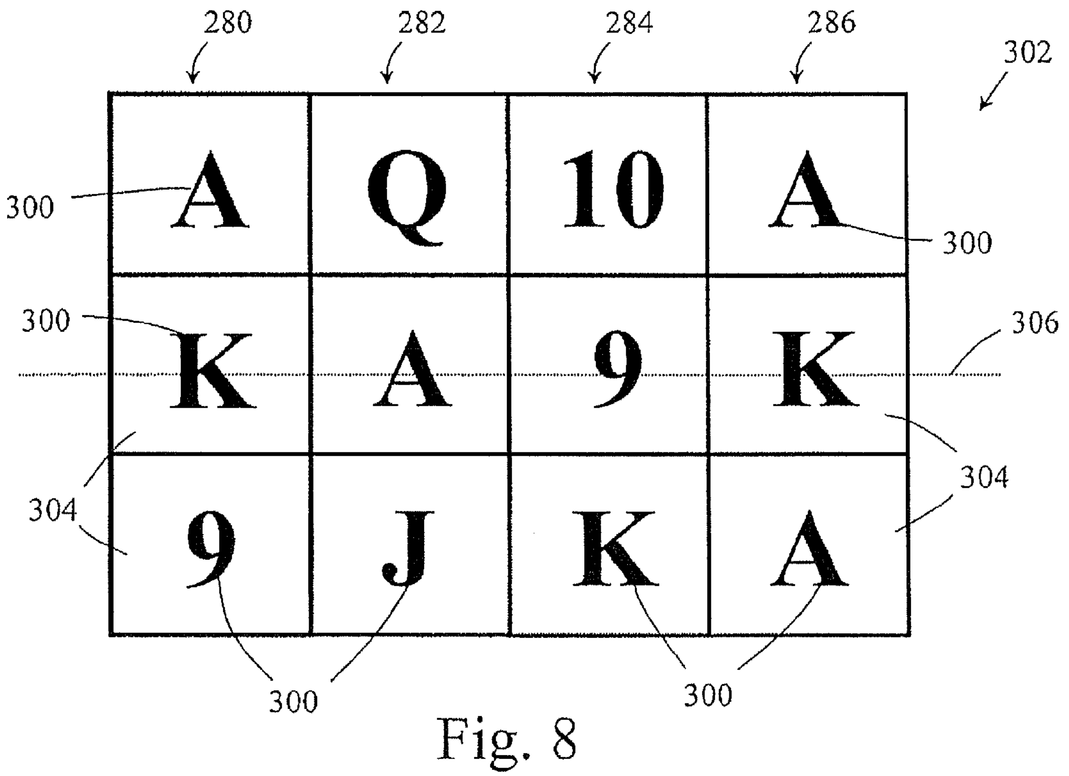
FIG. 8 is a diagrammatic representation of an example screen displayed by a gaming system in accordance with an embodiment of the present invention during implementation of normal game mode.

During implementation of a base game, the reels are spun and subsequently stopped 254 to show a plurality of symbols 300 in the display area 302, as shown in FIG. 8. The display area 302 is divided into 12 display positions 304, with each display position showing one symbol 300 and each reel including three associated display positions 304.

Winning outcomes are determined with reference to symbols appearing in defined win lines 306 or defined win combinations such as defined scatter combinations. Each defined win line 306 includes one display position from each reel with display positions in adjacent reels being disposed adjacent each other.

The outcome generator 28 determines 254 whether the symbols displayed at the display positions correspond to a winning outcome and, if a winning outcome exists, a prize associated with the winning outcome is awarded to the player.

In the present example, no winning combination exists so a prize is not awarded to a player.

If a trigger condition exists 256, special game mode commences which causes implementation 258 of a special feature. The special feature may include one or more special games.

During implementation of a special game, the display area 302 is modified 260 by the display position modifier 25 so that for at least one reel, additional display positions are provided. The reels are then spun and subsequently stopped to show a plurality of symbols in the display positions. Winning outcomes are then determined with reference to symbols appearing in defined win lines including any additional win lines defined as a result of adding new display positions or defined win combinations such as defined scatter combinations.

For example, as shown in FIG. 9, the reels are modified such that 3 base game display positions remain on the first reel 280, 6 special game display positions 305 are visible on the second reel 282, 12 special game display positions 305 are visible on the third reel 284, and 24 special game display positions 305 are visible on the fourth reel 286. In this way, by providing an increasing number of display positions 304, 305 from the first reel 280 to the fourth reel 286, a decision tree-like win line configuration 308 is produced wherein additional win lines are available.

Figure 10:
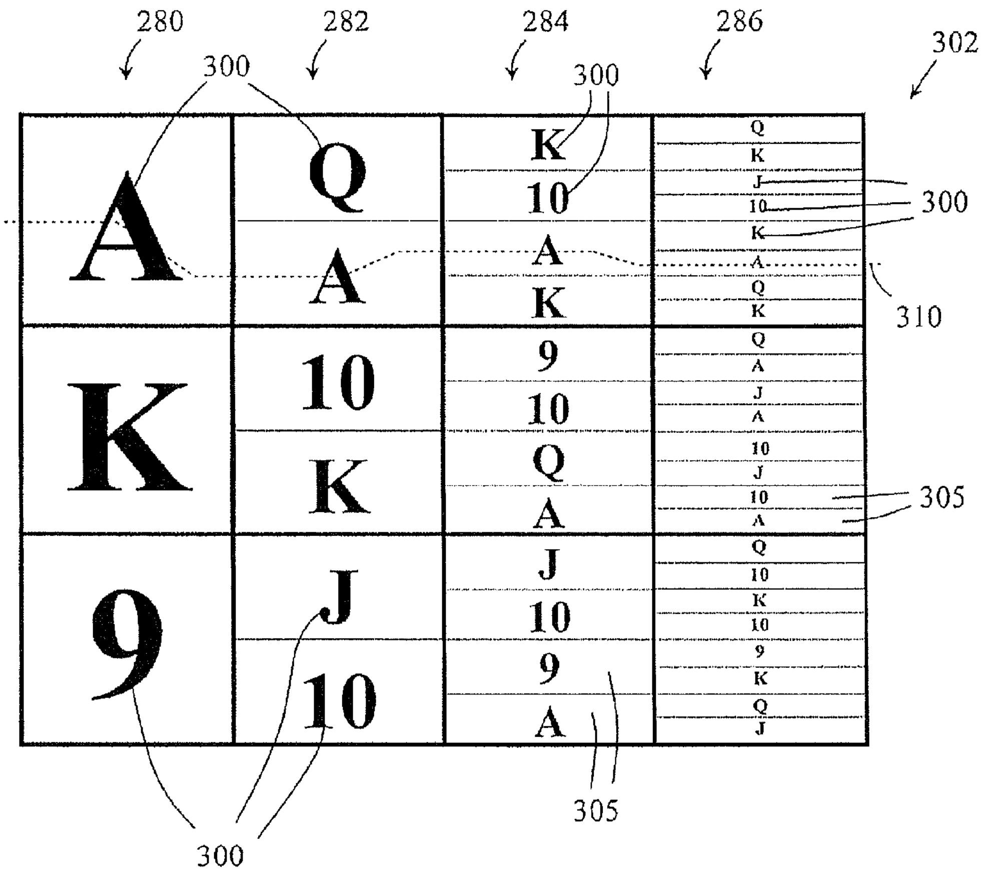
FIG. 10 is a diagrammatic representation of an example screen displayed by a gaming system in accordance with an embodiment of the present invention using the display position configuration shown in FIG. 9.

In FIG. 10, an example display area 302 including a plurality of symbols 300 selected during special game mode is shown diagrammatically. In this example, win lines are defined by adjacently disposed display positions with each win line including one display position from each reel 280, 282, 283, 286.

The game outcome shown in FIG. 10 corresponds to a winning outcome including 4 ACE symbols along a defined new win line 310 and, accordingly, a prize corresponding to 4 ACE symbols is awarded to a player. The prize may be a monetary prize, may be in the form of a number of free games which may be feature games, or may be in any other suitable form.

It will be understood that instead of adding an increasing number of special display positions 305 to the display area 302 from the first reel to the fourth reel, other variations are possible. For example, one or more display positions 304 in a base game may be randomly or otherwise selected and the selected base game display position replaced with additional special game display positions 305.

Figure 11:
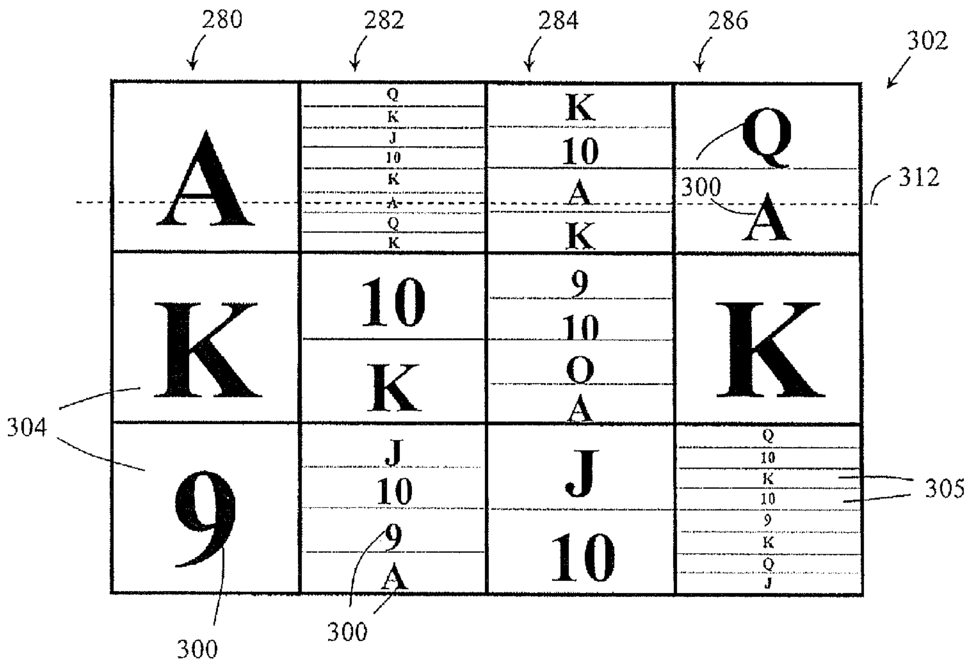
FIG. 11 is a diagrammatic representation of an example screen displayed by a gaming system in accordance with an alternative embodiment of the present invention using an alternative display position configuration.

In one embodiment shown in FIG. 11, during special game mode a display area 302 is provided wherein some base game display positions 304 have been randomly replaced with multiple special display positions 305, the number of which varies, for example randomly. In the example shown in FIG. 11, all base game display positions 304 in the first reel 280 are retained, the first base game display position in the second reel 282 is replaced with 8 special game display positions 305, the second base game display position in the second reel 282 is replaced with 2 special game display positions 305, the third base game display position in the second reel 282 is replaced with 4 special game display positions 305, the first and second base game display positions in the third reel 284 are each replaced with 4 special game display positions 305, the third base game display position in the third reel 284 are replaced with 2 special game display positions 305, the first base game display position in the fourth reel 286 is replaced with 2 special game display positions 305, the second base game display position in the fourth reel 286 is retained, and the third base game display position in the fourth reel 286 is replaced with 8 special game display positions 305.

The game outcome shown in FIG. 11 corresponds to a winning outcome including 4 ACE symbols along a defined win line 312 and, accordingly, a prize corresponding to 4 ACE symbols is awarded to a player. The prize may be a monetary prize, may be in the form of a number of free games which may be feature games, or may be in any other suitable form.

It will be understood that with the above described embodiments display position modifications are carried out according to base game display positions. However, variations are possible. For example, the displayed portion of a reel may be modified so as to include a randomly or otherwise selected distribution of new display positions which are not necessarily aligned with base game display position boundaries.

It will also be understood that during spinning of the reels, the symbols may move one display position at a time or a group of symbols may move together.

Figure 12:
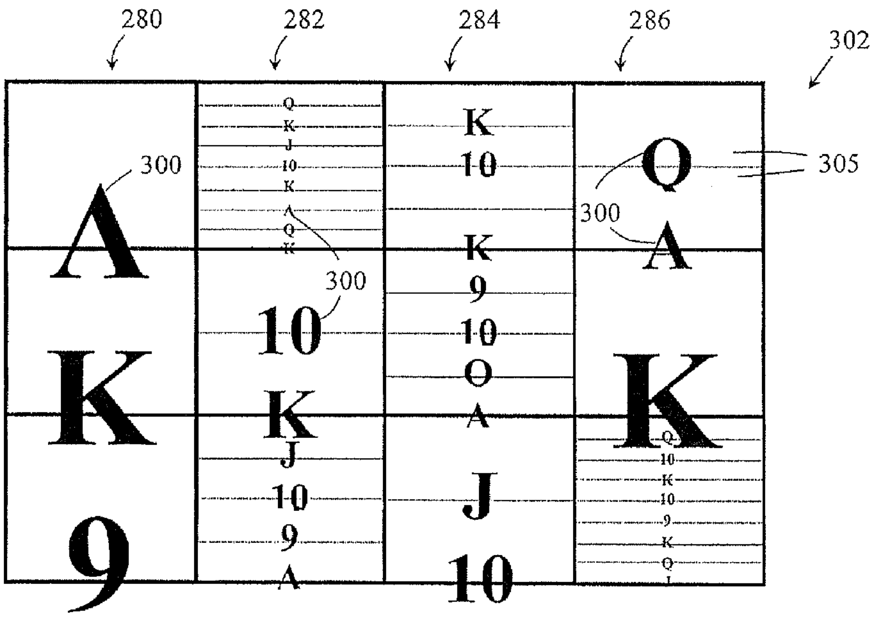
FIG. 12 is a diagrammatic representation of the example screen shown in FIG. 11 and illustrating movement of the symbols during use in accordance with an embodiment of the present invention.
Figure 13:
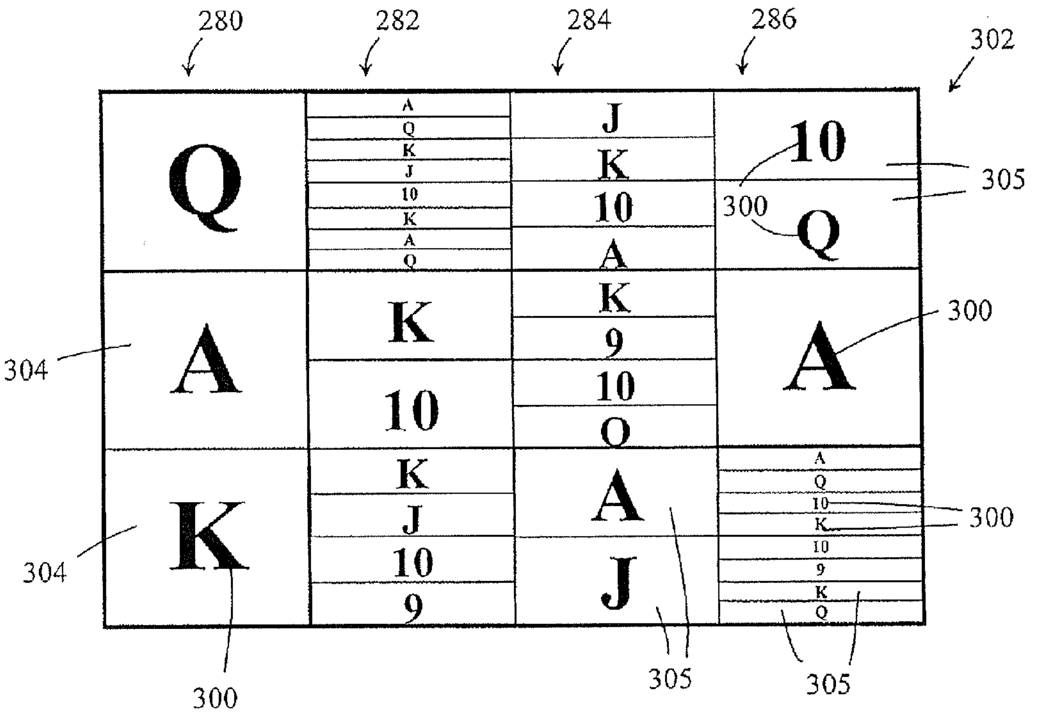
FIG. 13 is a diagrammatic representation of the example screen shown in FIG. 12 after the symbols have moved once during use.

For example, FIGS. 12 and 13 are views of the display area 302 at commencement of and immediately after a movement of the symbols during spinning of the reels during special game mode. In this example, the display positions are stationary and as the reels rotate the symbols move one display position at a time.

Figure 14:
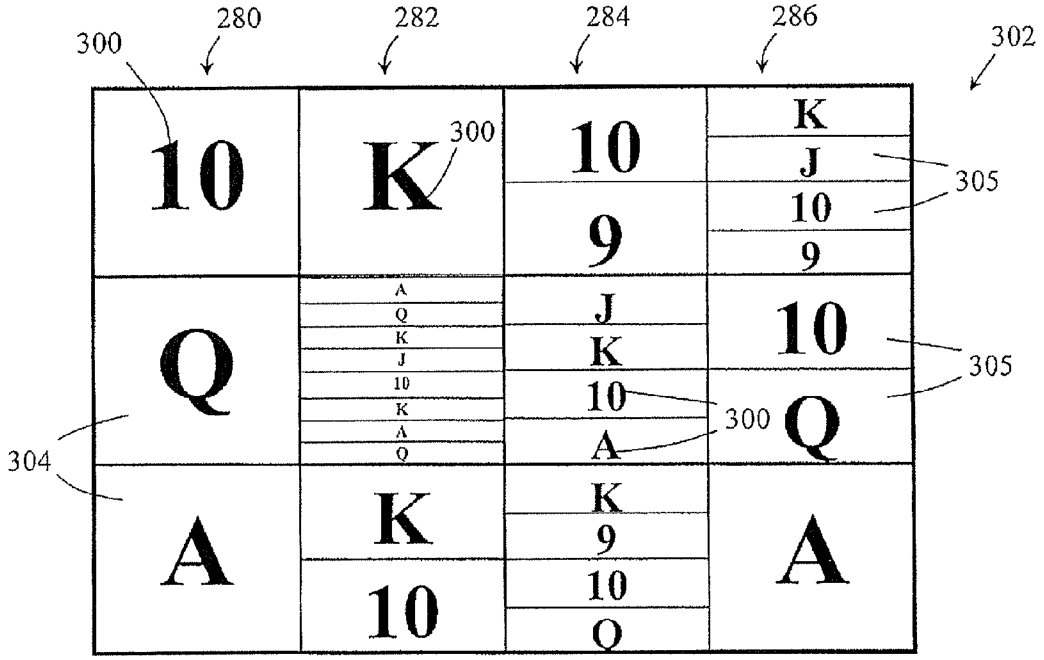
FIG. 14 is a diagrammatic representation of an example screen displayed by a gaming system in accordance with an alternative embodiment of the present invention and illustrating movement of the symbols during use in accordance with an alternative embodiment of the present invention.

Alternatively, referring to FIGS. 13 and 14 as views of the display area 302 at commencement of and immediately after a movement of the symbols during spinning of the reels during special game mode, the gaming system may be arranged such that as the reels rotate the display positions and the symbols disposed in the display positions rotate together.

In the claims of this application and in the description of the invention, except where the context requires otherwise due to express language or necessary implication, the words "comprise" or variations such as "comprises" or "comprising" are used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

Modifications and variations as would be apparent to a skilled addressee are deemed to be within the scope of the present invention.

The invention claimed is:

1. A gaming system comprising:

a symbol selector arranged to select a plurality of symbols for display at a corresponding plurality of display positions;

an outcome evaluator arranged to determine whether the selected symbols correspond to a winning symbol combination by evaluating symbols disposed in defined win lines; and a prize allocator arranged to allocate a prize to a player when a winning symbol combination exists in a defined win line; and wherein at least one display position is of different size to at least one other display position and the defined win lines are dependent on the respective sizes of and locations of the display positions; and wherein the gaming system is arranged to operate in normal game mode wherein display positions are the same size and the defined win lines are independent of the size and locations of the display positions, and special game mode wherein the display positions are of differing sizes and the defined win lines are dependent on the size and locations of the display positions; and wherein the gaming system comprises a display position modifier arranged during special game mode to replace at least one normal mode display position with a plurality of special game mode display positions, each special game mode display position being of smaller size that a normal mode display position.

2. A gaming system as claimed in claim 1, wherein the display positions are arranged in display position groups.

3. A gaming system as claimed in claim 2, wherein each display position group is associated with a reel.

4. A gaming system as claimed in claim 2, wherein the display positions associated with a display position group are of the same size.

5. A gaming system as claimed in claim 2, wherein the size of display positions in the display position groups progressively decreases across a display area such that the number of display positions in the display position groups progressively increases across the display area.

6. A gaming system as claimed in claim 5, wherein the size of the display positions in the display position groups progressively decreases across a display area in a direction from left to right across the display area.

7. A gaming system as claimed in claim 2, wherein a win line is defined to comprise display positions disposed in adjacent display position groups, each win line comprising one display position from each of said adjacently disposed display position groups.

8. A gaming system as claimed in claim 2, wherein at least one display position group comprises display positions of differing sizes.

9. A gaming system as claimed in claim 1, wherein the sizes of the display positions are randomly selected.

10. A gaming system as claimed in claim 1, wherein the gaming system is arranged to provide fixed display positions, and the symbol selector is arranged to select a plurality of symbols for display in the fixed display positions.

11. A gaming system as claimed in claim 1, wherein each selectable symbol is associated with a display position size such that selection of a symbol for display effects selection of the display position size.

12. A gaming system as claimed in claim 1, wherein the gaming system is arranged to commence special game mode when a specific game outcome occurs.

13. A gaming system as claimed in claim 1, wherein the gaming system is arranged to commence special game mode on the basis of a game event occurring during a game such as display of a particular symbol, in response to player input, based on the amount or type of bet placed, or when a special game is purchased by a player.

14. A gaming system as claimed in claim 1, wherein the gaming system comprises a gaming machine.

15. A gaming system as claimed in claim 1, comprising a gaming terminal and a gaming server in networked communication with the gaming terminal.

16. A method of gaming comprising providing a plurality of display positions, at least one display position being of different size to at least one other display position;

selecting a plurality of symbols for display at respective display positions;

determining whether the selected symbols correspond to a winning symbol combination by evaluating symbols disposed in defined win lines, the defined win lines being dependent on the respective sizes and locations of the display positions;

allocating a prize to a player when a winning symbol combination exists;

operating in normal game mode wherein display positions are the same size and the defined win patterns are independent of the size and locations of the display positions, and special game mode wherein the display positions are of differing sizes and the defined win patterns are dependent on the size and locations of the display positions; and replacing at least one normal mode display position with a plurality of special game mode display positions during special game mode, each special game mode display position being of smaller size that a normal mode display position.

17. A method as claimed in claim 16, comprising arranging the display positions in display position groups.

18. A method as claimed in claim 17, wherein each display position group is associated with a reel.

19. A method as claimed in claim 17, wherein the display positions associated with a display position group are of the same size.

20. A method as claimed in claim 17, comprising defining the display positions in the display position groups such that the size progressively decreases across a display area and the number of display positions in the display position groups progressively increases across the display area.

21. A method as claimed in claim 20, comprising defining the display positions in the display position groups such that the size of the display positions in the display position groups progressively decreases across a display area in a direction from left to right across the display area.

22. A method as claimed in claim 21, comprising defining a win line to comprise display positions disposed in adjacent display position groups, each win line comprising one display position from each of said adjacently disposed display position groups.

23. A method as claimed in claim 17 wherein at least one display position group comprises display positions of differing sizes.

24. A method as claimed in claim 16, comprising randomly selecting the sizes of the display positions.

25. A method as claimed in claim 16, comprising providing fixed display positions, and selecting a plurality of symbols for display in the fixed display positions.

26. A method as claimed in claim 16, wherein each selectable symbol is associated with a display position size such that selection of a symbol for display effects selection of the display position size.

27. A method as claimed in claim 16, comprising commencing special game mode when a specific game outcome occurs.

28. A method as claimed in claim 16, comprising commencing special game mode on the basis of a game event occurring during a game such as display of a particular symbol, in response to player input, based on the amount or type of bet placed, or when a special game is purchased by a player.

* * * * *